United States Patent
Willoughby et al.

(10) Patent No.: US 6,511,691 B1
(45) Date of Patent: Jan. 28, 2003

(54) FOOD PRODUCTS AND CO-INJECTION PROCESSES FOR PREPARING SAME

(75) Inventors: Chris L. Willoughby, Battle Creek, MI (US); Gary A. Larrivee, Dalton, MA (US)

(73) Assignee: Kellogg Company, Battle Creek, MI (US)

(*) Notice: Subject to any disclaimer, the term of this patent is extended or adjusted under 35 U.S.C. 154(b) by 0 days.

(21) Appl. No.: 09/484,381

(22) Filed: Jan. 14, 2000

Related U.S. Application Data

(60) Provisional application No. 60/116,135, filed on Jan. 15, 1999.

(51) Int. Cl.⁷ .................................................. A23P 1/00
(52) U.S. Cl. ........................ 426/512; 426/516; 426/559
(58) Field of Search ................................ 426/512, 516, 426/549, 559, 656

(56) References Cited

U.S. PATENT DOCUMENTS

| | | | | |
|---|---|---|---|---|
| 3,904,769 A | | 9/1975 | Sair et al. | 426/104 |
| 3,978,244 A | | 8/1976 | Sair | 426/580 |
| 4,076,846 A | | 2/1978 | Nakatsuka et al. | 426/656 |
| 4,216,240 A | | 8/1980 | Shirai et al. | 426/516 |
| 4,740,379 A | | 4/1988 | Noguchi et al. | 426/512 |
| 5,108,772 A | * | 4/1992 | Wilbur | 426/559 |
| 5,208,059 A | * | 5/1993 | Dubowik et al. | 426/516 |
| 5,279,658 A | | 1/1994 | Aung | 106/154.1 |
| 5,320,669 A | | 6/1994 | Lim et al. | 106/157 |
| 5,650,188 A | * | 7/1997 | Gaubert et al. | 426/549 |
| 5,941,197 A | | 8/1999 | Axelrod | 426/635 |

* cited by examiner

*Primary Examiner*—George C. Yeung
(74) *Attorney, Agent, or Firm*—Howard & Howard

(57) ABSTRACT

Food products are prepared using co-injection molding apparatus. The food products are layered or enrobed. Preferred products expand upon cooking.

19 Claims, No Drawings

FOOD PRODUCTS AND CO-INJECTION PROCESSES FOR PREPARING SAME

This application claims the benefit of U.S. Provisional Application No. 60/116,135, filed Jan. 15, 1999.

FIELD OF THE INVENTION

The present invention relates to food products prepared using co-injection molding techniques. Co-injection molding processes of the invention allow for the layering or enrobing of one food stream around another to produce a layered or enrobed shaped food product. Preferably, the product has at least one layer that expands ("puffs") upon heating.

BACKGROUND OF THE INVENTION

Consumers are offered a large number of food products that have been prepared and/or treated in numerous ways for considerations such as convenience, storage, stability, and organoleptic considerations, e.g., taste or feel during mastication, and appearance. Food producers are continuously seeking ways to differentiate their products from others by means of coloring, flavoring, design and/or other characteristics.

It is highly desirable to produce a product that has a 3-dimensional shape to mimic, e.g. the shape of well known images or characters, or to otherwise generate an interest with the consumer. It is also important, as mentioned above, that the products simultaneously have the requisite aesthetic properties, e.g. taste and mouthfeel. Such products are desirable because they provide excellent product recognition. Various types of products meeting these criteria are commercially available.

For example, U.S. Pat. No. 5,108,772 discloses a puffable gelatinized dough pellets which pop upon microwave heating in a consumer microwave oven. The pellets include an outer methylcellulose skin or casing of sufficient tensile strength to allow buildup of internally generated steam pressure upon microwave heating. Upon sufficient buildup of steam pressure, the skin fails suddenly, allowing the pellet to puff explosively thereby simultaneously causing an audible popping sound. The pellets are prepared from starchy compositions such as cooked farinaceous dough or dehulled popcorn.

Molding processes have been used in the plastics industry to produce numerous products of varying size and shape. Such processes have also been used to make biodegradable articles from foodstuffs. For example, U.S. Pat. No. 5,320,669 to Lim et al. discloses a biodegradable thermoplastic composition made of cereal grain that is treated with an organic solvent to extract lipids that may undergo undesirable reactions duling thermal processing of the composition. The cereal grain may further be treated with a cross-linking agent that binds the proteins and/or starches together such that the resultant product has improved water resistance compared to articles made without the cross-linking agent. The thermoplastic composition may then be formed, e.g. by injection molding, into an article of desired shape.

U.S. Pat. No. 5,279,658 to Aung discloses a composition said to be suitable for forming shaped articles, e.g. biodegradable packaging material, comprising a mixture of flour, starch, and water. The flour and starch may be obtained from natural sources, e.g. cereal grains. The mixture heated and mixed under a sufficient pressure, temperature and moisture content and for a sufficient period of time that when the pressure is decreased the mixture expands to form a composition which is rigid when cooled and stable over a predetermined temperature. A shaped article, e.g. a may be formed from the composition by injecting the composition into a molding press and forming the composition into a shaped article.

U.S. patent application Ser. No. 09/189,447 filed Nov. 10, 1998, incorporated herein by reference, describes food products prepared by injection molding techniques that puff upon heating.

Alternate methods of producing improved shaped layered or enrobed food products and processes for preparing the food products are desirable. The present invention provides such improved shaped food products as well as methods and apparatus for preparing the food products.

SUMMARY OF THE INVENTION

The present invention relates to improved shaped food products having at least two foodphases which are distinguished by at least one characteristic such as composition, color, flavor, expandability. The shaped food product is prepared by co-injecting two distinct foodstreams into a mold. The shaped food product can assume a variety of forms, such as layered (sandwiched) or enrobed. Preferably, at least one of the phases is expandable ("puffable") upon heating, e.g., with a microwave oven. The products are prepared from a variety of starting materials, including fruits, farinaceous grains or grain derivative products such as grain flour, starches such as tapioca, candy or confection bases such as chocolate or sugar based compositions, batters, pastes, or any form that is sufficiently flowable to be used in the co-injection process. The food products produced by the co-injection process may be a final product or may be the form of a half-product which will be further processed, typically by the consumer, to yield the final product. For example, an expandable product in unexpanded form is a half-product that will be further processed by the consumer to produce the final product which is in expanded ("puffed") form. Expandable products may be puffed by heating e.g. by exposure to microwave radiation, heating in a conventional oven, or by deep-frying in a fat or fat-substitute.

The shaped products of the invention may be prepared in many forms including layered in sandwich-like fashion, enrobed, i.e. an outer layer enrobing a core, tubular, or the like. Preferred expandable half-products include an expandable inner core and an outer layer that substantially and preferably completely surrounds the inner core. It is preferred that the food product, if expandable, yield an audible sound "pop" when heating, mimicking the sound of an expanding popcorn kernel. The particular arrangement of layers or the number of layers in the final product is not critical to the invention. Expandable products preferably expand to from 1 to 20 times the dimensions or volume of the corresponding half-product.

Other starch sources may be added, e.g. potato starch, tapioca, can also be added in addition to or instead of the grain or grain derived material. Amylopectin is the preferred starch, and sources high in this starch are preferred for inclusion in the formulation. Formulations high in amylopectins tend to have better expansion qualities compared to formulations having comparable amounts amylose.

The products of the invention are prepared by co-injecting at least two foodstreams into the mold of a co-injection device, such as those commercially available and commonly used in the plastics industry. The food streams may be the same, but typically will differ from one another in at least one aspect. The foodstreams may be in a variety of forms including a batter, paste, liquid, solution, suspension, syrup, dough, or any other form that is capable of being injected into a mold are independently or simultaneously injected into the mold to form a product having an inner core enrobed by an outer layer, or a product having two distinct layers, i.e., a sandwich type structure.

In a preferred embodiment, expandable products are obtained by injecting a foodstream comprising an expandable farinaceous material into a mold to partially fill the mold. The expanded product is then prepared by adjusting the temperature of the mold either upward downward in comparison to the temperature of the foodstream to puff the product, which is then ready for consumer use. The temperature adjustment will depend, primarily on the composition of the foodstream. In this embodiment, it is preferred that the expandable food product includes a gas or a compound that will produce a gas, e.g. edible carbonate salts, upon heating of the mold, which puffs the product. Expansion can also be accompanied by decreasing the internal mold pressure to the farinaceous material expands to form the puff product inside the mold.

The invention is described in more detail below.

DETAILED DESCRIPTION

The shaped food products of the present invention can be prepared in a variety of forms with greater detail than prior art products using commercially available co-injecting apparatus commonly used in the plastic industry. A typical co-injection apparatus will have at least two injection units, and an injection mold. Each injection unit is capable of receiving a foodstream and each has a screw or other means for propelling the foodstream through the unit in the direction of the mold. It is preferred that each of these units has a screw, but it is contemplated pistons or pumps, e.g. a liquid pump can be used depending upon the composition of the foodstreams. The operating parameters of each unit will be independently adjustable, so that the temperature, pressures, and feed rates, etc. are adapted to the given food input. The foodstreams are generally injected one at a time into the mold. The food inputs are fed through to an exit end of the apparatus. At the exit end, the foodstreams pass via runners through a gating area and into the mold. The mold may be heated or cooled as required, and mold pressure will also preferably be adjustable, to obtain a suitable product. Preferably, the foodstream intended to form the outer layer will be injected first, with the inner core material, pushing the first injected material around the mold cavity such that it forms a layer around the inner core material. Typically, the temperature of the foodstream will range from 30° F. to 600° F. and pressure will range from 0 to 50,000.

The shaped products may take a variety of forms, but comprises at least two phases having at least one distinct difference therebetween. One of the phases may enrobe the other to form a core with an outer layer, or, if the outer layer is very then, may serve as a thin coating around the other, may be layered upon one another, may be attached at an interface to one another, or other forms that will be readily apparent to those skilled in the art.

The phases, and their respective foodstreams will differ in at least one of taste, color, texture, composition, physical characteristics such as the ability to expand, or the like. It is possible that the at least two foodstreams may be the same composition, such as in the case where to different inlets are available to the mold to achieve an improved mold fill.

The foodstreams that are injected into the molds may be in any suitable physical forms, such as a dough, batter, liquid, suspension, solution, eutectic, plasticized mass, or any other form that is capable of being injected into a mold by a co-injector apparatus. Thus, the foodstreams may vary widely in composition, and can contain just about any edible substance provided the foodstream meets the desired physical parameters, i.e. the foodstream is sufficiently flowable or plastic to be used in the process.

In a preferred embodiment, at least one foodstream comprises from 1 to 100% by wt of a fruit, preferably from about 25 to 75% by wt. Dried (dehydrated) fruit is particularly useful, and almost any fruit may be used, including grapes (raisins), apricots, strawberries, blueberries, apples, bananas, and the like. An edible sweetener may be added, if desired.

In another preferred embodiment, the shaped products are expandable half-products that expand upon heating. To prepare an expandible shaped product, at I east two foodstreams are prepared one of which is expandable upon heating. A first foodstream will form the inner core of the product, and a second will provide a layer that substantially or completely covers surrounds the inner core. Preferably, the inner core is the expandable material, and the outer layer is a non-expandable material. It should be understood that by non-expandable it is contemplated that the material will exhibit some degree of expansion upon heating, simply because of the heating process. However, the non-expandable portion will expand to a much lesser degree than the expandable layer and does not substantially contribute to the overall expansion of the half-product.

The expandable portion is prepared from a farinaceous material, e.g. a whole grain or grain derived material such as flour, bran, starch, and the like. It is contemplated that starches derived from non-grain sources may also be used, e.g., potato starch, tapioca, alone or in combination with the farinaceous material. The stalling grain can be a whole grain or a portion of the grain, e.g. the grit, flour. The grain or portion thereof may be preprocessed, e.g. rotary cooked, bumped, or pregelatinized, as desired. Corn, wheat, barley, rice, wheat, and oats are preferred grains, although others may be used as desired.

The farinaceous material typically comprises from about 1 to 100% by weight of the expandable product, and from 1 to about 100% of the half-product or puffed product. Preferably from about 20 to about 95% by weight of the half-product or the puffed product is provided by the farinaceous material, and more preferably from about 20 to about 50% by weight. Sweetening agents may be added to provide flavor as well as texture. Suitable sweetening agents include those well known in the food industry, e.g natural sweeteners such as sugars, and synthetic sweeteners such as aspartame or saccharine. Sucrose is a preferred sweetening agent. Generally, sweetening agents are included as about 1 to about 50% by weight of the half-product, and preferably from about 1 to about 20% by weight.

It is preferred that an edible salt is added to the composition in amounts ranging from 0.5 to about 5% by weight. Potassium chloride and sodium chloride ale preferred.

Fruits or processed fruits, e.g. dried fruits, may also be included in the foodstuffs of the present invention. Preferred fruits include grapes, strawberries, and the like. Dried fruit products such as raisins are particularly preferred.

Other additives commonly used in the food industry may also be included in the expandable composition. Such additives include flavorants, colorants, textulizing agents, preservatives, lubricants, and the like. Monoglycerides may be added as a processing aid, and typically will be added in a range of from 0.1 to 1% by weight. Other processing aids that can be included in the expandable composition of the present invention will be readily apparent to those skilled in the art.

The non-expandable foodstream may be prepared by simply mixing all of the ingredients to form a dough which may then be fed to the co-injection apparatus. Preferably, a pellet is prepared via extruding the dry and wet materials, e.g., through a twin screw extruder, cutting the extrudate into suitably sized pieces and drying the pellets, e.g. to about 15% water content. The water content of the non-expandable foodstream can be adjusted as desired, and the inclusion of certain ingredients, e.g. oils, allow the starchy farinaceous material to be used at a lower water content than composition without the such ingredient(s). For example, if a vegetable oil is added to the starchy farinaceous composition, the water content can be reduced relative to the water content of the composition without the oil. The addition of all oil provides the added benefit of providing lubrication which assists in removing the half-products from the mold. When included, oil is preferably composition is included in amounts from about 1 to about 20% by weight of the starchy farinaceous composition. Suitable oils include any edible oils such as cottonseed oil, vegetable oils such as corn oil, and the like. Alternatively, the mold may be sprayed with an edible lubricant.

Preferably, the expandable composition is premanufactured e.g. by forming pellets of the starchy farinaceous composition using an extruder. If a flour is included in the expandable composition, pellets containing the flour(s) are preferably prepared for use in the injection molding apparatus. Suitable pellets can be formed by, e.g., preparing and cooking a dough including the farinaceous material using a single or twin screw extruder and cutting the extrudate into pellets . The dough preferably has a moisture content of from about 20 to about 40% during the extrusion processes, and the resultant pellet is dried to achieve a moisture content of from about 1 to about 20, preferably from about 5 to about 15, and more preferably form about 10 to about 12 percent, by weight. Drying can be achieved by heating in an oven, or by drying at room temperatures.

These dried extruded pellets are then fed in the co-injection apparatus, where they are heated and or mechanically worked, e.g. via a screw, to impail sufficient plasticity such that they are suitable for injection into the mold. Water may need to be added to the pellets during the co-injection process to attain the desired degree of plasticity. The water content of the expandable foodstream will be composition is preferably in the range of from about 1 to about 40%, preferably from about 5 to about 20%, and more preferably from about 10 to about 18%. The water content apparently contributes to the thermoplasticity of the composition during the molding process, and optimum water content will vary with the particular ingredients used, e.g. from grain to grain, but the overall water content is preferably within the aforementioned ranges. The non-expandable composition preferably includes from about 5 to 90% by weight of a grain flour, 1 to 35% of a sugar, and from about 0.1 to about 15% of a film forming agent.

A non-limiting list of film forming agents that can be used in accordance with the present invention include edible gums, natural polymers, synthetic polymers, cellulose derivatives, or other art known film forming agents. A preferred film former is methylcellulose A4C (Dow Chemical). Alginates, xanthan gum, gum arabic, locust bean gum, carageenan, methylmethacrylates such as the Eudragits, ethylcellulose, sodium carboxymethylcellulose, and the like are among a non-limiting list of suitable film formers that may be used in accordance with the present invention.

Plasticizers may be added to achieve a desired degree of plasticity of the film former as required.

The non-expandable portion may also include a shell forming material in amounts of from 0.1 to about 10% by weight of the final half-product. The shell material may be added to the aforementioned ingredients or may replace all or a portion of the flour forming agent. The flour may be provided from the grains mentioned hereinabove, and sweetening agents are also discussed supra.

As with the expandable portion, it is preferred that the non-expandable portion is provided as a pre-manufactured pellet. These pellets may be prepared, e.g., by blending liquid ingredients in a blender or homogenizer to achieve a homogeneous liquid, which is transferred to an extruder where it is mixed with the dry ingredients in the extruder and formed into pellets The pellets are dried to a moisture content of 15% by weight or less. These pellets are then introduced into the co-injector apparatus and injected into a mold to obtain a suitable final product. The dried pellets are rendered sufficiently plastic by the co-injector apparatus, e.g. by mechanical working with a screw such that the resultant foodstream can be introduced into the mold.

In a preferred embodiment, a slurry of cellulose derivative and a sugar solution or syrup, e.g., high fructose corn syrup (HFCS) may be used to prepare the unexpandable foodstream. Cellulose, corn syrup, an emulsifier such as lecithin, and optionally a shell forming agent are found into a slurry prepared by simply mixing the ingredients, e.g., in a blender or homogenizer to obtain a homogeneous mixture. The mixture is transferred to an extruder, where it is mixed with flour and extruded as a mixture having a 10–40% moisture content which is dried to 5 to 20% moisture. It is possible that the pellet the pellets can be produced directly without further drying at a moisture content within the desired range without additional drying.

To prepare the half-products, the expandable and non-expandable compositions are charged to their respective hoppers of a co-injector apparatus, e.g. such as a multi-gate co-injection apparatus commercially available from Koitec and Arburg GmbH. The co-injection apparatus preferably has at least two zones, and a mold section. The mold area of the apparatus preferably includes a runner, gates, and a shaped hollow portion. The first and second zones are equipped such that they are capable of propelling the foodstreams through to an exit end of the respective zones and into the mold. Preferably, each zone has a screw feed having a screw and a cylinder wall, a heated chamber and nozzle. It is also contemplated that at least one foodstream can be a liquid and injected via a pump, or that other means, e.g. pistons, can be used to inject a foodstream into the mold.

When a screw feed is used, preferably it is heated to impart a sufficient degree of plasticity into the foodstreams such that they are suitable for injection.

The amount of water in either the expandable or non-expandable foodstream may also be adjusted to achieve the desired degree of plasticity. Each screw propels its foodstreams, which has attained a thermoplastic quality, down the length of the extruder portion of the apparatus to a pressurized chamber portion. The foodstreams are injected into the mold at food pressures of from about 0 to about 50,000 psi. It is also preferred that the temperature of the zones are within the ranges cited for the screw feed portion of the apparatus, and is preferably the same temperature as the screw feed portion of the apparatus. The first foodstream passes through the chamber into the nozzle into the mold via a hollow runner portion of the mold, and is enveloped by the second foodstream so that the second foodstream substantially or completely envelops the first foodstream during entry into the mold. The mold may have a common manner and gates for each foodstream.

The running or gating areas can be heated or cooled separately from the mold, and this will depend on the composition of the foodstream In certain instances, one foodstream will be heated while the other is cooled.

The runner portion leads to the gating areas that directly lead to the shaped portion of the mold. The gating areas are typically from about 1/64 to about 3/8 of an inch in diameter. Shaped portion areas of the mold are filled with the compositions of the foodstream. The filled mold is preferably cooled to maintain the shape when the product is removed from the mold.

Typical operating parameters for the co-injector are: barrel temperature 30–550° F.; mold temperature 30–550° F., runner and gate temperature of from 30 to 550° F.; cavity pressure 0 (for example, in the case of a material that behaves as or is a liquid) to 50,000 psi; overall cycle time 5 seconds to 5 minutes, injection flow speed 0.25 to 10 in$^3$/s. It should be understood that the parameters will vary with the particular composition.

Expandible half-product are to be further processed e.g. by the consumer to a desired end product by heating to produce the expanded or "puffed" end product. Heating can be accomplished by use of a conventional oven, drying or microwave radiation. The final puffed products generally have dimensions of from about 2 to about 10 times that of the half-product.

In an alternative embodiment, an injection molding apparatus will be used to partially fill the mold with a composition that will be expanded in the mold to form the final shaped puffed product. In this embodiment, an expandable farinaceous material will be injected into a mold under processing conditions similar to those described herein. The mold will then be heated to expand the material to substantially fill the mold and form the final puffed product.

Alternatively, the product may be expanded by injecting a gas, in gaseous state or as a supercritical liquid, into the foodstream as it exits the first zone of the apparatus but before it enters the mold. Under proper conditions, e.g. by adjusting the pressure of the mold, the product will expand due to expansion of the gas, forming the puffed product within the mold. In this embodiment, the apparatus may only have one zone and will be provided with a suitable means of introducing the gas into the foodstream at the appropriate point along the injection pathway. Gas may also be generated in situ in the foodstream via addition of gas forming chemicals, e.g. carbonate salts, that generate carbon dioxide upon chemical or physical manipulation, e.g. via reaction with an organic acid, by heating, etc. Any physical or chemical means of introducing the gas into the foodstream are meant to be encompassed by the claimed invention.

Without being limited to a particular scientific theory, it appears that starches play a large role in expansion of a molded half-product. At the molecular level, the starch molecules in the granules can be described as a "ball of yarn", that is they are randomly aligned but in a rather compact arrangement. During processing, a large percentage of the starch granules are destroyed and the individual starch molecules released therefrom are free to realign. Due to the food pressures encountered in the extruder die, the starch molecules are forced to align in a compact formation, and tend to align in a unidirectional manner. It is hypothesized that a narrow nozzle or gating diameter and high injection pressure contribute to the unidirectional alignment of the starch molecules. High mold pressures and rapid cooling maintain the unidirectional alignment of the starches in the molded product even after ejection from the mold. Water and air are trapped inside the products as well. Heating the product causes a rapid release of water from the product, and the water actually pulls on the starch molecules and realigns them in a random three-dimensional matrix. The realignment of the starch molecules into a three-dimensional matrix results in the expansion or "puffing" of the product. This explanation for discussion purposes only and is in no way intended to limit the scope of the present invention.

The following non-limiting examples illustrate preferred embodiments of the present invention.

DETAILED DESCRIPTION OF THE PREFERRED EMBODIMENTS

All of the products puffed from about 1 to about 20 times the size of the half-product when microwaved.

EXAMPLE 1

An expandable core material was prepared containing, on a dry basis, 46.85% corn flour, 45.00% potato starch, 5.00% sugar; 2.50% sodium chloride (salt) and 0.65% monglyceride. The core material was prepared by blending the ingredients in a batch mixer, and transferring the blend to a twin screw extruder having a 5 mm die set at a screw rotation of 180 rpm, 40% torque. Dry materials were blended and fed in to the extruder at a feed rate of 2.5 lbs/hr, water at 1.25 lbs/hr. The die pressure was 1050 psi. The extrudate was formed into pellets, and dried to a moisture content of 9 to 15%.

EXAMPLE 2

An expandable core material was prepared according to the method of Example 1 having the following composition: 46.85% corn flour; 45.00% tapioca starch; 5.00% sucrose; 2.50% salt; and 0.65% monoglyceride.

EXAMPLE 3

An expandable composition was prepared as follows: medium grain lice (87.5% dry wt.), flavoring (10%) and salt (2.5%) are mixed and cooked in a rotary steam injected cooker for one hour at a steam pressure of 17 psi. The product is dried and cooked to a moisture content of between 8% and 12%.

EXAMPLE 4

An expandible composition was prepared using 100% corn flour according to the process of Example 1, except that a single screw extruder was used.

NON-EXPANDABLE COMPOSITION

EXAMPLE 5

A non-expandable composition was prepared to having the following components: 40% corn flour; 30% white wheat flour, 20% whole oat flour; 5% sugar; 2% salt; 5% monoglyceride; methylcellulose A4 (dow chemical) cold gel formula.

The methylcellulose is added to water to form a gel (7% methylcellulose by weight). This gel is pumped into the feed of a twin screw extruder, where the dry ingredients are added and all ingredients are mixed. The extruder was a twin screw extruder (57 mm screw diameter)set at 180 rpms, a flour input rate of 2.5 lbs/min, the slurry is pumped in at 1.3 lbs/min; 35% torque and a die pressure of 900psi. Pellets of about 5 mm in diameter are formed and dried to a 10–14% moisture content.

EXAMPLE 6

A non-expandable food composition was prepared having the following composition:

| Wet materials | |
|---|---|
| High fructose corn syrup (42%) | 86.2% |
| Methocel A4C | 11.8% |
| Lecithin | 2% |

The HFCS, Methocel A4C and lecithin are blended in a blender to form a slurry for two minutes, and the slurry is then homogenized and directly fed into the feed section of a twin screw extruder at a rate of 4.0 lbs/min. White wheat flour is fed into the twin screw extruder at a feed rate of 6.5 lbs/min. Water is added at 0.5 lbs/min. Torque was set at 51%, die pressure was 1650 psi; screw rotation was 250 rpm's. The extruder was formed into pellets.

EXAMPLE 7

Preparation of Co-injected Product

An expandable half-product was prepared utilizing a co-injector having two feed zones, each having a screw. One zone charged with the expandable pellets of Example 1, and the other with the non-expandable pellets of Example 6. The screws were set a suitable operating rotation, and the temperatures were maintained in each feed zone to maintain sufficient plasticity for injection into the mold. The non-expandable portion was injected into the mold via a gate, and the mold will be then filled to capacity via injection of the expandable portion. The non-expandable portion forms an outer layer enveloping the inner expandable core. The final product comprised 25% outer layer, 75% core (by weight).

Other mold injected expandible half-products were also prepared ranging in a weight ratio of expandable unexpandable of from about 5:80 to about 80:5.

The molded product of Example 7 was heated via a conventional microwave oven to expand the product. The product expanded to approximately 10 times the volume of the half-product.

Other variations of the invention will become apparent to those skilled in the art and are intended to be within the scope of the claims appended hereto. All references cited herein are hereby incorporated by reference in their entireties.

Further variations will be apparent to those skilled in the art without departing from the spirit and scope of the claims appended hereto.

It is claimed:

1. A method for preparing an expandable shaped half-product comprising the steps of:
   a) providing a first foodstream of a non-expandable food material to a first injection unit;
   b) providing a second foodstream of an expandable food material comprising a farinaceous grain to a second injection unit;
   c) providing a cooled injection mold in communication with the first and the second injection units; and
   d) forming an expandable shaped half-product by injecting the first foodstream and the second foodstream into the mold through the first injection unit and the second injection unit, respectively, with each foodstream at a foodstream pressure of from about 0 to about 50,000 pounds per square inch, holding the injected foodstreams in the cooled mold until the non-expandable food material and the expandable food material have set so that the shape is retained when the half-product is removed from the mold and wherein the expandable shaped half-product is capable of expanding at least two-fold after heating of the formed expandable shaped half-product.

2. The method of claim 1, wherein one of step a) or step b) further comprises providing a foodstream comprising 1.0 to 100.0% by weight of at least one fruit to the first or the second injection unit, respectively.

3. The method of claim 1, wherein one of step a) or step b) further comprises providing a foodstream comprising 25.0 to 75.0% by weight of at least one fruit to the first or the second injection unit, respectively.

4. The method of claim 1, wherein step a) comprises providing a first foodstream comprising 5.0 to 90.0% by weight of at least one grain or grain flour, 1.0 to 35.0% by weight of at least one sugar, and from 0.1 to 15.0% by weight of at least one film forming agent.

5. The method of claim 1, wherein step a) comprises providing a first foodstream comprising extruded pellets having a moisture level of about 1.0 to 15.0% by weight to the first injection unit.

6. The method of claim 1, wherein step b) comprises providing a farinaceous grain comprising corn, wheat, barley, rice, oats, or mixtures thereof.

7. The method of claim 1, wherein step b) comprises providing a second foodstream of an expandable food material comprising a farinaceous grain and an additional starch comprising potato starch, tapioca, an amylopectin, or mixtures thereof.

8. The method of claim 1, wherein step b) comprises providing a second foodstream comprising extruded pellets having a moisture level of about 1.0 to 20.0% by weight to the second injection unit.

9. The method of claim 1, wherein step b) comprises providing a second foodstream comprising extruded pellets having a moisture level of about 5.0 to 15.0% by weight to the second injection unit.

10. The method of claim 1, wherein one of step a) or step b) further comprises providing a foodstream comprising 1 to 50% by weight of a sweetener to the first or the second injection unit, respectively.

11. The method of claim 1, wherein one of step a) or step b) further comprises providing a foodstream comprising 1 to 20% by weight of a sweetener to the first or the second injection unit, respectively.

12. The method of claim 1, wherein step d) comprises injecting the first foodstream into the mold first followed by injection of the second foodstream into the mold to form an enrobed expandable shaped half-product wherein the half-product has an outer layer formed of the non-expandable food material and an inner core of the expandable food material, wherein the formed enrobed expandable half-product is capable of expanding at least two-fold after heating of the formed enrobed expandable half-product.

13. The method of claim 1, wherein step d) comprises injecting a portion of the first foodstream into the mold first, then injection of all of the second foodstream into the mold, followed by injection of the remainder of the first foodstream to form an enrobed expandable shaped half-product wherein the half-product has an outer layer formed of the non-expandable food material and an inner core of the expandable food material, wherein the formed enrobed expandable half-product is capable of expanding at least two-fold after heating of the formed enrobed expandable half-product.

14. The method of claim 1, wherein step d) comprises injecting a portion of the second foodstream into the mold first, then injection of all of the first foodstream into the mold, followed by injection of the remainder of the second foodstream to form a sandwiched expandable shaped half-product wherein the half-product has outer layers formed of the expandable food material and an inner layer of the non-expandable food material, wherein the formed sandwiched expandable half-product is capable of expanding at least two-fold after heating of the formed sandwiched expandable half-product.

15. The method of claim 1, wherein step d) comprises injecting the first foodstream into the mold simultaneously with injection of the second foodstream into the mold to form an expandable shaped half-product wherein the half-product has at least one portion formed from the non-expandable food material and at least one portion formed from the expandable food material, wherein the formed expandable half-product is capable of expanding at least two-fold after heating of the formed expandable half-product.

16. The method of claim 1, wherein step d) comprises injecting the second foodstream in an amount relative to the first foodstream so that the formed expandable shaped half-product comprises an amount of from 20 to 95% by weight of the second foodstream of the expandable food material.

17. The method of claim 1, wherein step d) comprises injecting the second foodstream in an amount such that the expandable shaped half-product is capable of expanding from 2 to 20 fold after heating of the formed expandable shaped half-product.

18. The method of claim 1, further comprising after step d) the step of heating the expandable shaped half-product to form an expanded shaped food product having a size that is 2 to 20 fold greater than a size of the expandable shaped half-product formed in step d).

19. The method of claim 18, wherein the heating comprises heating in a microwave, heating in an oven, or heating by deep-flying the expandable shaped half-product formed in step d).

* * * * *